B. B. LEWIS.
STARTING DEVICE FOR EXPLOSIVE ENGINES.
APPLICATION FILED JUNE 24, 1912.

1,082,885.

Patented Dec. 30, 1913.

WITNESSES:

INVENTOR
Benjamin B Lewis

UNITED STATES PATENT OFFICE.

BENJAMIN B. LEWIS, OF BRIDGEPORT, CONNECTICUT.

STARTING DEVICE FOR EXPLOSIVE-ENGINES.

1,082,885.  Specification of Letters Patent.  Patented Dec. 30, 1913.

Application filed June 24, 1912. Serial No. 705,532.

*To all whom it may concern:*

Be it known that I, BENJAMIN B. LEWIS, a citizen of the United States, residing at Bridgeport, in the county of Fairfield and State of Connecticut, have invented a new and useful Starting Device for Explosive-Engines, of which the following is a specification.

My invention has reference to starting mechanism for explosive engines, and consists in certain improvements which are fully set forth and described in the following specification and shown in the accompanying drawings, which form a part thereof.

The object of my invention is to provide a starting mechanism which may be readily applied to explosive engines employed on automobiles, and for other purposes, whereby a premature explosion and backward starting of the engine crank shaft cannot injure the operator, when starting the engine, and which shall at the same time render such operation comparatively easy to perform. This object I accomplish by utilizing the side thrust occurring between intermeshing spiral gears on parallel shafts by means of a combination of parts for this purpose hereinafter described, and set forth in the accompanying drawings in which:—

Figure 1:
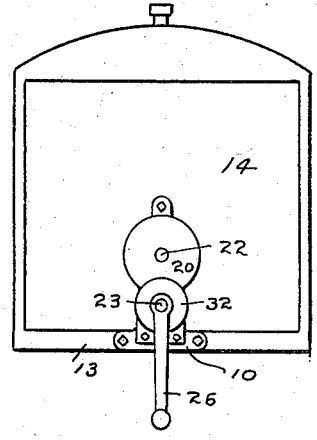
Figure 2:
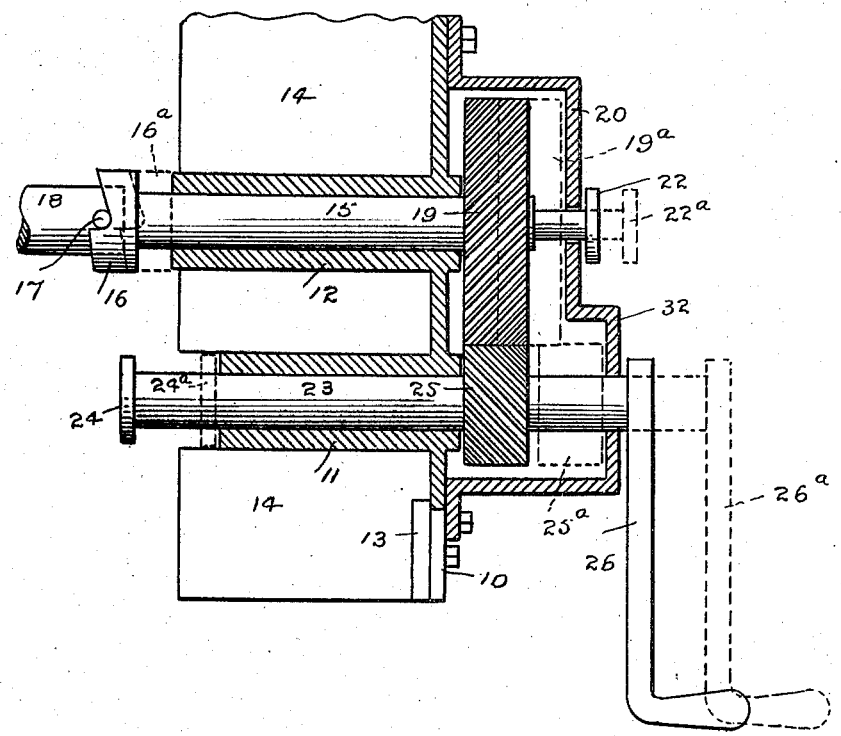

Figure 1 is a front elevation of an automobile radiator with the starting device attached to the same. Fig. 2 is a side elevation partly in section, of the device in operative position on the radiator of an automobile.

The numerals, 10, of the drawing, denote a starting crank bolted to a section, 13 of the chassis of an automobile, and having parallel shaft bearings, 11 and 12, preferably integral with it, extending backward within the radiator. This shaft support, together with the relative position of its shaft bearings, either perpendicular or horizontal, may be shaped to suit the differing structures of automobiles to which my invention is to be applied.

Cranking shaft 15 is slidingly journaled in bearing 12 and carries on one end a grip, 16, having operative contact with pin 17 of the engine shaft 18. At its opposite end is fixedly mounted the left handed spiral gear 19. Starting lever shaft 23 slidingly journaled in shaft bearing 11, terminates interiorly with a collar 24. Fixedly mounted on it is the right handed spiral gear 25, intermeshing with gear 19 of the cranking shaft, and having starting lever 26 fixedly mounted upon its exterior terminal. I preferably employ in this connection, a gear case 20, inclosing the intermeshing gears and bolted to the exterior face of the crank support, and having a raised section, 32, circumferential of gear 25. Through cover 20 pass starting lever shaft 23, and push rod 21, attached to cranking shaft, and having an exterior cap 22.

When the mechanism of my invention is in an inoperative position, indicated by the dotted lines 19ª, of the cranking shaft gear, 16ª of the grip and 22ª of the push rod cap, the operative process is as follows: Cap 22 is pushed inwardly, carrying shaft grip 16 of the cranking shaft into operative connection with pin 17 of the engine shaft. A reverse right to left, cranking actuation of starting lever 26 by the operator, by means of the intermeshing gears, results in the ordinary clock hand movement of the cranking shaft 15, and the connected engine shaft.

My invention guards against a back kick of the engine in the process of cranking as follows: The backward explosive energy thus exerted through spiral gear 19 of the cranking shaft on the intermeshing spiral gear 25 of the starting lever shaft results in a side thrust being exerted on gear 25, carrying it and its associated parts outwardly into the dotted line positions, 25ª and 26ª of the gear and cranking lever, and thus disconnecting the intermeshing gears. The normal operative position of the several parts is resumed by an inward sliding of cranking lever and shaft bringing the gears once more into intermesh. In the several operations of the cranking shaft and of starting lever, when thus journaled slidingly to obviate the danger arising from a back kick of the engine, a continuous inward push of the starting lever in the hands of the operator is required to counterbalance the outward side thrust of the spiral gears. This suffices for the ordinary force requirement of cranking but readily yields to the excessive amount of force exerted in a back kick of the engine.

In the operation of starting the engine, after the grip has been pushed back by pin 17 of the engine shaft, cap 22 is pulled outward throwing cranking shaft, 15, and its connected parts into the inoperative position represented by the dotted lines of its several members.

The reciprocal action of the spiral gears, each upon the other may be stated as follows:—When cranking lever 26 is turned from right to left in the operation of cranking, the right handed spiral gear, 25, of the starting lever shaft, 23, exerts an inward thrust on the intermeshing, left handed spiral gear, 19, of the crank shaft, tending to maintain grip, 16, of the crank shaft in operative contact, by means of pin, 18, with the crank shaft of the engine, while a reverse movement of the starting lever exerts an opposite side thrust effect, throwing the crank shaft backward into the inoperative position marked by the dotted line position, 19$^a$, of Fig. 2 of the drawing.

As an integral part of my invention consists in the action of the spiral gear, through the medium of the starting lever, both in throwing the cranking shaft inwardly into operative connection with the cranking shaft of the engine and also, by a reverse movement of the starting lever, in throwing it backward and out of operative connection with the same, I therefore do not limit the scope of my invention to the precise combination of parts in which the starting lever is journaled slidingly in its shaft bearing but also, when deemed desirable, employ this member in a longitudinally fixed position within the same. This combination of parts would be shown in Fig. 2 by having starting lever shaft, 23, terminate in the collar, 24$^a$.

I preferably employ for the starting lever shaft a spiral gear of one half the diameter of that with which it intermeshes on the cranking shaft. The operation of cranking thus becomes much easier of performance with a proportional less wear on connecting parts.

What I claim is:—

1. In a starting device for an explosive engine, the combination with the crank shaft of the engine of a starting lever support, having two parallel bearings, a cranking shaft slidingly journaled in one of the bearings, carrying at one end a shaft grip, a spiral gear fixedly mounted upon the opposite end of said shaft, a shaft journaled within the other bearing, having a longitudinal movement, a spiral gear made fast to said shaft and intermeshing with the spiral gear of its parallel member, said last named shaft having an interior terminal collar, and a starting lever fixedly attached thereto.

2. In a starting device for an explosive engine the combination with the crank shaft of the engine of a starting lever support having two parallel bearings, a cranking shaft slidingly journaled in one of the bearings, carrying at one end a shaft grip, a spiral gear fixedly mounted upon the opposite end of said shaft, a shaft journaled within the other bearing with a longitudinal movement, a spiral gear made fast to said shaft and intermeshing with the spiral gear of its parallel member, a starting lever fixedly attached to said last named shaft, and an inclosing gear case having a passage way for the starting lever shaft.

3. In a starting device for explosive engines, the combination with the crank shaft of the engine, of a starting lever support, having two parallel bearings, a cranking shaft slidingly journaled in one of the bearings, carrying at one end a shaft grip, a spiral gear fixedly mounted upon the opposite end of said shaft, a shaft journaled within the other bearing, a spiral gear made fast to the said shaft and intermeshing with the spiral gear of its parallel member, a retaining collar, and a starting lever fixedly attached to the said last named shaft.

4. In a starting device for an explosive engine, the combination with the crank shaft of the engine of a starting lever support having two parallel bearings, a cranking shaft slidingly journaled in one of the bearings, carrying at one end a shaft grip, a spiral gear fixedly mounted upon the opposite end of said shaft, a shaft journaled within the other bearing, a spiral gear made fast to the said shaft and intermeshing with the spiral gear of its parallel member, a starting lever fixedly attached to said last named shaft, and an inclosing gear case having a passage way for the starting lever shaft.

In testimony that I claim the foregoing as my own, I have hereto affixed my signature in the presence of two witnesses.

BENJAMIN B. LEWIS. [L. S.]

Witnesses:
HENRY C. STEVENSON,
MARY C. RIBA.